(12) United States Patent
Rodgers

(10) Patent No.: US 7,561,049 B2
(45) Date of Patent: Jul. 14, 2009

(54) SCOPE REDUCTION OF RFID MEDIUM

(76) Inventor: James Neil Rodgers, 8853 214th Pl., Langley (CA) V1M-2H9

( * ) Notice: Subject to any disclaimer, the term of this patent is extended or adjusted under 35 U.S.C. 154(b) by 347 days.

(21) Appl. No.: 11/695,057

(22) Filed: Apr. 2, 2007

(65) Prior Publication Data

US 2008/0238681 A1     Oct. 2, 2008

(51) Int. Cl.
    *G08B 13/14*     (2006.01)
(52) U.S. Cl. .................. 340/572.1; 340/572.4; 340/505; 340/531; 340/539.1; 340/10.1; 340/10.4
(58) Field of Classification Search ............. 340/572.1, 340/572.4, 572.8, 505, 531, 539.1, 10.1, 340/10.4; 235/375, 385, 472.02; 705/1, 705/14, 35
See application file for complete search history.

(56) References Cited

U.S. PATENT DOCUMENTS

| | | | |
|---|---|---|---|
| 6,121,544 A | 9/2000 | Petsinger | |
| 6,970,070 B2 | 11/2005 | Juels et al. | |
| 7,110,792 B2 | 9/2006 | Rosenberg | |
| 7,163,152 B2 | 1/2007 | Osborn et al. | |
| 2004/0030601 A1* | 2/2004 | Pond et al. ..................... | 705/16 |
| 2006/0214783 A1* | 9/2006 | Ratnakar .................... | 340/505 |
| 2008/0217411 A1* | 9/2008 | Ledwith et al. ........ | 235/472.02 |

* cited by examiner

*Primary Examiner*—Hung T. Nguyen
(74) *Attorney, Agent, or Firm*—James Neil Rodgers

(57) ABSTRACT

This invention reduces communication insecurity caused by the air interface during a typical RFID transaction sequence. The RFID industry wide problems of skimming and eavesdropping are eliminated by providing a hermetically sealed container for the purposes of securely interrogating electro magnetic signals which are transmitted between an RFID transponder and an RFID interrogator. According to this invention chose in action are embedded with a silicon based system on a chip. When presented by the owner of the chose in action to an authorized body, the chose in action is ingested into a hermetically sealed container and then initiated through atmospheric pressure change. The transponder and interrogator communicate with a central database through a prompt and response, split algorithm. According to this invention the RFID transponder has minimal data and security is shifted from the RFID transponder to the computer host of the system.

5 Claims, No Drawings

SCOPE REDUCTION OF RFID MEDIUM

BRIEF SUMMARY OF THE INVENTION

One of the great advantages of Radio Frequency Identification (hereinafter "RFID") is that it facilitates wireless remote reading of multiple RFID transponders. However, this advantage is also the greatest weakness of RFID. For example, there have been demonstrations of RFID reading at ranges of 100+ meters. Although legitimate users welcome this range, so to do the illegitimate users. Unauthorized users can obtain the same valuable information contained on RFID transponders as authorized ones. It is, for example, entirely feasible that thieves could efficiently scan a warehouse or loading dock to pinpoint the most valuable goods. It is also feasible, for example, that terrorists could scan an airport for those carrying U.S. Passports. It is also feasible that criminals, for example, could scan a crowd for potential kidnapping victims. RIFD tags identify any object they are associated with. For example, remote sensing devices such as contact less smart cards or anti theft codes for car locks or E-Passports can facilitate identity theft. This is usually accomplished through use of an unauthorized scanner remotely reading aforementioned items.

It is clear that RFID systems, without security design, when used for supply chain management, are not usually problematic. However, for retail goods, currency and credit cards it is essential that the RFID industry stay ahead of ingenious and industrious engineers who will go to work on facilitating the theft of critical data and information from RFID transponders. As soon as there is serious money available as profit in the enterprise of stealing RFID data, then the crooks will become very adept at it. The E-Passport field is a good example of the burgeoning problem of RFID skimming and eavesdropping. Skimming occurs when an intruder with a reading device in the vicinity of the passport holder surreptitiously reads the electronic information on the chip without the passport holder knowing. Eavesdropping occurs when an intruder intercepts data as it is being transmitted from the chip to an authorized reader. For example, E-Passports contain RFID chips which store an electronic copy of passport information. This information is typically name, digitized picture, digitized fingerprints or visas. Standing on its own this is not a problem. The E-Passport works like automatic toll collection on roads or automatic fare collection on subways. These systems work via proximity. The risk to the E-Passport holder is the possibility of surreptitious access. In other words, your passport information may be read without your knowledge or consent by a government trying to track your movements, a criminal trying to steal your identity or someone just curious abut your citizenship.

Initially these potential breaches of security problems were minimized by the U.S. State Department. In response to some negative publicity regarding E-Passport vulnerability, security measures have been put into place by the U.S. State Department. E-Passports will now be issued with security shielded covers manufactured using metal fibers making it harder to read the chip when the passport is closed. There are also access controls and encryption mechanisms being implemented, making it much harder for an unauthorized reader to collect, understand and alter the data on an E-Passport.

Furthermore, it will be standard practice that the U.S. E-Passport will be signed cryptographically. This means that the information cannot be altered without detection. Research of Kevin Mahaffey and John Hering of Flexilis, a computer security company, shows that electronic passports can be remotely spied upon despite the electro magnetic signal block shields included in current US designs for E-Passports. For example, even if the E-Passport is opened one centimeter, the data can be skimmed.

Notwithstanding the protective metal shield on the E-Passport, it is important to ask how many times a U.S. citizen opens their passport when abroad for the purposes of hotels, banks, or internet cafes. Anyone intent on harvesting passport data could set up a surreptitious reader at one of these obvious locations which are prime for skimming. The State Department insists that the RFID transponder located in the U.S. E-Passport can be read only by a reader that is inches away; however, the empirical research indicates that much greater read rate distances are possible. It is also important to note that any security features designed for an E-Passport chip should be mandated to be resilient to any intrusion for a period of at least ten years. This is the lifespan of a U.S. passport.

Unauthorized skimming devices can be built from everyday, and readily available, items. This has been demonstrated by Han Kirschenbaum and Avishai Wool in their article, "How to Build a Low-Cost, Extended-Range RFID Skimmer," published May 8, 2006. This article concluded that the ISO-14443 standard used for applications such credit cards, national identification cards, E-Passports and physical access control cards are easily skimmed. The skimming device built by the authors skimmed from a distance of 35 cm and was built on a budget of less than $100. The authors state that simple RFID tags, which are programmed to respond to any reader, are immediately vulnerable to skimming attacks.

One anti skimming system the U.S. State Department is looking into was created by the International Civil Aviation Organization, an adjunct to the United Nations. They created the international specifications for countries adopting RFID passports and designed standards for a process called Basic Access Control (herein "BAC"). The way BAC operates is that the data on a passport is stored on an RFID chip. This chip is located in the back folder of the passport. The data is locked and unavailable to any reader that doesn't know a secret key or password to unlock the data. In order to obtain the key to unlock the passport the passport officer would need to physically scan the machine readable text that is printed on the passport page beneath the photo. According to BAC, the reader would then hash the data to create a unique key that could be used to authenticate the reader and unlock the data on the RFID chip.

Basic Access Control prevents skimming as it does not allow remote readers to access data on the passport without the passport being physically opened and scanned through a reader. Basic Access Control prevents eavesdropping in that it would encrypt communication channels that open when the data is sent from the chip to the reader. Initially the U.S. State Department did not plan to include more data on the RFID chip than what could be easily read by looking at the passport. They initially believed that anti-skimming technology such as metal fibers in the passport cover would prevent anyone from surreptitiously reading a passport as long as it was closed. The original mindset of the State Department was that the chip in the passport could not be read at a distance of more than 10 cm if the passport was open. This has proven to be incorrect. The European Union had embraced BAC for its passports as they planned to digitize more data to the chip than just the written data that appears on the passport photo page. For example, many countries in the European Union plan to include at least two fingerprints in a digitized format in their passport chip. Frank Moss, deputy assistant secretary for passport services, says testing results on BAC readers are mixed and that the ancillary technology is not mature enough to support BAC at this time.

There are some minor flaws with BAC which are detailed in a paper written by Juels, Molnar, and Wagner titled, "Security and Privacy Issues in E-passports". The authors point out that BAC stores a pair of secret cryptographic keys in the chip inside the E-Passport. The concept is simple: The RFID chip disgorges its contents only after a reader successfully authenticates itself as being authorized to receive that information. The authors state that this system of encryption is flawed in that the design for the encryption keys is insufficiently secure. They claim that the use of a "single fixed Key" for the lifetime of the e-passport creates vulnerability.

Similarly, the New York Times reports in their Oct. 23, 2006 edition that researchers have discovered privacy pitfalls in no swipe credit cards. This is a reference to contact less credit cards which utilize RFID as a transmission venue. The problem is the same problem that is encountered with E-Passports, the air, the shared medium of transmission available to legitimate and illegitimate user alike. The air is the propagation or coupling medium. As the electro magnetic signals enter this media the signal is open to legal and illegal reception. The card companies have implied through their advertising that they use the highest level of encryption allowed by the U.S. government and incorporate 128-bit encryption. Tests on these contact less smart cards found that the cardholder's name and other data was being transmitted without encryption and in plain text. The researchers found that they could skim and store the information from a card with a device the size of a couple of paperback books. The researchers put the skimmer together employing only $150 and materials from readily available computer and radio components. The researchers claim they could make a skimmer that was the size of a pack of gum for $50, given enough time. Furthermore, the skimmed information can be read through a wallet or an item of clothing. The article concludes that security for contact less smart cards is amazingly weak. Your credit card number, card expiration date and your name are in your pocket ready for electronic pick pocketing.

In a comment by John Pescatore, vice president for Internet security at Gartner, a technology market research firm, Mr. Pescatore said he was surprised by the lack of security in transmitting personal data. He said it was a mistake that companies often made in rolling out early versions of a technology. He called it depending on security through obscurity. In other words, what Mr. Pescatore is saying is who is really going to look to find out how weak the security actually is? The companies are hoping that no one will, especially the crooks!

The shared radio medium allows eavesdropping and unauthorized tag reading which poses security threats to individuals. Radio is a shared medium: it is easy for an intruder to either eavesdrop on the communication between the tag and the reader (eavesdropping) or query the tag without authorization (skimming).

Scarce computational and storage capabilities of the RFID tag, or RFID transponder as it is also called, make designing security systems for RFID communication systems challenging. For example, the use of extensive cryptography based authentication or high quality random number generators on the tag side, as required by BAC, are not possible in the current RFID business model. This is because it is imperative that the tag side of the RFID equation be cost controlled. In other words, the RFID tags must be inexpensive to manufacture and operate. Accordingly, this translates into very limited memory and processing abilities on the RFID tag or transponder. In essence, the feasibility of extensive computational cryptography on the tag is not part of the current RFID business model.

It has been proposed that extensive cryptographic operations can be shifted to the reader or interrogator side of the RFID equation. However, this requires the tag or transponder to either store large keys or frequently communicate with the reader/interrogator over a secure out of band channel in order to obtain authorization information.

When the security issue is truly analyzed, there is a need for cryptography only because the tag and the reader communicate over an insecure channel (radio). All the information exchanged over this channel is available to the intruder (eavesdropping). Furthermore, the intruder can gain access to the database records and to the internal memories of the tag or the reader given clever enough hackers (skimming).

The solution, as proposed by this invention, is to limit skimming and eavesdropping for chose in action. This invention incorporates by reference Rodgers application Ser. No. 11/689,316 titled, "RFID tracking of chose in action". This invention defines chose in action as does application Ser. No. 11/689,316 as, "polymer banknotes, paper banknotes, traveler's checks, revenue and postage stamps, bond certificates, coupons and tickets of value, security inks, certificates of origin, checks, gift certificates, passports, plastic cards, stock certificates, vehicle titles, vital records, insurance policies." However, the definition in this invention is expanded to include Personal Identity Verification cards or PIV cards as they are known which are used, for example, as ID badges and access cards for employees and contractors of the federal government of the United States of America. This invention contemplates limiting skimming and eavesdropping although not through the traditional methods of shielding or cryptography. Shielding does not work when the RFID transponder or tag is transmitting, such as when the U.S. E-Passport is opened for inspection. Cryptography does not work as the tag needs to be uneconomically large to accommodate the data required to cipher or decipher messages. Furthermore, cryptography is continuously being hacked and broken by ingenious crooks. In other words, the cryptography is obsolete from the date it is issued as clever hackers find a method of breaking the code almost immediately. This problem has turned into more of a game than a criminal activity; however, it is a well known problem in the RFID industry. This invention proposes reducing the insecurity of the shared medium, the air, by reducing the scope of the shared medium. For example, this invention contemplates in one of the preferred embodiments an elegant solution which retains all of the features of RFID convenience while removing the air medium security risk. One of the preferred embodiments of this invention contemplates a hermetically sealed interrogator for an RFID enabled, contact less, credit card. The method of operation is that when a shopper presents the card to the retailer, the card goes directly from the hand of the shopper or the initiator into a mechanical slot designed for the induction of a contact less credit card. The card does not touch the hands of the retailer, except in extraordinary circumstances, thereby reducing the chance of skimming. The mechanical reader ingests the card through an ingress device into a hermetically sealed iron interrogator which is part of the induction device. The interrogator is designed to be impervious to outside penetration by electro magnetic signals. When inside the sealed interrogator the contact less card is milked of its information. This reading session is less than one second. The card is mechanically disgorged and egresses from the reader directly into the hand of the shopper. The design of the interrogator is that of a protective container which totally precludes the possibility of skimming or eavesdropping. This is accomplished by taking a container which uses the raw material of iron and nickel or mild steel and stamping the container to be exactly the size of ISO standard contact less credit cards. The interior of this container is shaped through a mold via injection or it will be filled with a vacuum formed plastic insert. The interior of the container is a combination of a microwave absorber with edge level shielding which will absorb or suppress GHz frequency electro-magnetic signals, enabling the interrogator to be hermetically sealed. These absorbers are thin, magnetically loaded elastomeric sheets designed to provide protection at high angles of incidence for surface wave attenuation. Absorbing elastomer located within the stamped metal housing of this container is designed to meet the needs of radiation confinement for a high frequency application in the 24 to 40 GHz frequency range. This described process retains the contact less credit card in the exact position for accurate and secure RFID reading without fear of skimming or eavesdropping. In other words, the contact less credit card is mechanically passed through a type of hermetically sealed Faraday cage which completely encloses and envelops the interrogation environment obviating electro magnetic seepage.

Other preferred embodiments include an interrogator with a hermetically sealed interrogating device which is manufactured to exactly the parameters required to ingress and egress, plus securely read, a stock certificate. By extension, and only by way of example and not limitation, this same procedure could be applied to a bond certificate, or a personal check, or an E-Passport or any of the items defined as chose in action herein. The chose in action will contain the system on a chip inventive step of Rodgers application Ser. No. 11/686,946 titled, "Precisely tuned RFID antenna," and Rodgers Application 11/683,056 titled "RFID silicon antenna," both of which are incorporated herein by reference. Therefore, the interrogation of the chip will be conducted in the 24 to 40 GHz range. The information located on the chip of the chose in action is limited to only that which is necessary to prompt a response from a control database. The control database provides all critical data for commercial operation of this inventive system. In applying this inventive system all critical data is removed from the chose in action and is located and provided from the back end host computing system. This back end system can be secured crypto logically with as much algorithmic data as is necessary to make it secure. Furthermore, it can be updated the moment one asymmetric crypto logic algorithm is cracked. Any information which needs to be updated on the chip from the backend database can be written to the chip by the interrogator at the time of interrogation of the chip without fear of interception or tampering. This updated information would come from the back end database.

The only information required on the chip located in the chose in action is just enough to prompt a response from the host database which then properly authenticates and identifies the chose in action. This would be accomplished through the auspices of a prompt and response, split algorithm. Therefore, any information surreptiously skimmed or eavesdropped would be minimal and inconsequential.

BACKGROUND OF THE INVENTION

U.S. Pat. No. 7,110,792 by Rosenberg issued Sep. 19, 2006 describes and contemplates enabling wireless personal information transfer with increased security. This invention contemplates a "smartlink module" in claim 1 and claim 24 which controls initialization of a smart card and enables transactions with specifically designated readers and confirms transactions through cellular telephone links. One of the embodiments on page 15 contemplates an RFID money exchange using the smartlink system. This Patent is very akin to BAC discussed herein. This Patent can be distinguished from the present invention as the present invention contemplates a solution to the security problem by limiting the scope of the shared medium. U.S. Pat. No. 6,970,070 by Juels, et al. issued Nov. 29, 2005 contemplates a singulation algorithm implemented by the reader which blocks identification within a privacy zone. This is explained in paragraph one and two of the Summary of the Invention section of the Patent. This Patent is in response to the need for security without the use of tag based cryptographic functionality or additional computational infrastructure external to the tag. The Background of the Invention section of this Patent describes prior art alternatives to security which are lacking in efficacy. These include: a.) Kill switch, b.) Faraday cage, c.) Active jamming, c.) Cryptography, d.) External agent re-encryption: all of which are incorporated into the prior art description of this invention by reference and are to be used as examples of failed prior art. This Patent can be distinguished from the present invention which contemplates a solution to the security problem by limiting the scope of the shared medium.

U.S. Pat. No. 7,163,152 by Osborn, et al. issued Jan. 16, 2007 describes a method of a protective container for a magnetic card, such as a credit card, which shields against damaging magnetic fields. Although it contemplates a stamped metal container of iron or nickel or a container which is stamped from mild steel and also contemplates injection molding and vacuum formed plastic inserts as described in the Abstract section, this Patent contemplates and is limited strictly to magnetic cards. This Patent can be distinguished from the present invention in that it contemplates only magnetically readable cards and not a system on a chip RFID system, as in the present invention, which limits and contains the scope of radiation of an RFID interrogation session which takes place in the 24 to 40 GHz range. Furthermore, the present invention does not contemplate magnetic cards.

U.S. Pat. No. 6,121,544 by Petsinger issued Sep. 19, 2000 contemplates an electromagnetic shield to prevent surreptitious access to contact less smartcards. This Patent contemplates an electromagnetic shield made of soft magnetic alloy with a very high initial and maximum magnetic permeability. The Patent describes a shield which has been fully hydrogen annealed to develop optimum magnetic shielding properties. The high intrinsic electrical conductivity of the magnetic shielding simulates a Faraday cage to further shield a contact less smartcard/RFID tag from electric fields. This is all described in the Abstract of the Patent. This Patent can be distinguished from the present invention in that it concerns itself exclusively with contact less smart cards. The present invention concerns itself with the entire group defined herein as chose in action. Furthermore, the Objects and Advantages section of the Patent at paragraph c and d contemplates a shield which totally or "partially" covers the contact less smart card. The present invention can be distinguished in that it contemplates a hermetically sealed container for the chose in action. In other words, a reader which completely covers a chose in action when it is being interrogated. Moreover, the present invention is a system for transferring critical data and information from an RFID tag or transponder to a back end control system so that all pertinent information is securely contained within a command and control center which administers state of the art cryptography thereby facilitating secure transmission. In furtherance, this Patent contemplates the use of high nickel content alloy metal known as Perm alloy or Mu-Metal as described and outlined in paragraph c of the Objects and Advantages section. This type of material is not contemplated by the present invention.

In an article titled "Security and Privacy Issues in E-passports" authored by Juels, Molnar and Wagner, and specifically at page 2, the following security and privacy threats are enumerated with comments: 1.) Clandestine scanning—basically skimming, as described herein, with the comment that the International Civil Aviation Organization (ICAO) the adjunct of the United Nations, as discussed herein, as enunciated in ICAO document 9303, does not require authentication of identity on E-Passports which results in unprotected skimming. 2.) Clandestine tracking—ISO 14443 stipulates emission without authentication of chip ID on protocol initiation which facilitates the physical tracking of the individual passport holder. 3.) Cloning—ICAO requires digital signatures on E-Passports however this does not bind the data to a particular passport or chip so that it offers no defense against passport cloning. 4.) Eavesdropping—Faraday cages are discussed but only as it applies to E-passport covers and not to a radiation confinement device as contemplated herein. 5.) Biometric data leakage —ICAO standard includes digitized headshots. These could be compromised on a chip. In the present invention, all biometric information is contained in the back end controlling computer system and not on the chip. 6.) Cryptographic weaknesses —ICAO contemplates a cryptographic key which functions to authenticate the identity of the holder and to encrypt all data transmitted between the passport and the reader. However, once a reader knows the key there is no mechanism for revoking access. Therefore, a passport holder traveling to a foreign country gives that country's Customs agents the ability to scan that particular passport in perpetuity.

SUMMARY OF THE INVENTION

This invention seeks to obviate security problems with chose in action which are embedded with a system on a chip. This invention contemplates a useful, non-obvious and novel step to accomplish same by transferring the security of the system on a chip to the interrogator side of the RFID equation. In brief, this invention contemplates that the interrogator secures the chose in action in a hermetically sealed container or chamber for the purposes of reading the contents of the RFID transponder embedded into any particular chose in action. The hermetically sealed container limits the scope of the air interface while concurrently increasing air pressure and density. The shared air media is the primary challenge for all RFID security risks. According to this invention minimal information is on the chip. There is only enough information on the chip to prompt a response from the host database. This prompt authenticates the chip through a unique identifier; usually a digital alpha-numeric system. All processing and all critical information is stored in the host database and is communicated to the retailer or merchant through secure telephone connections and displayed on a video display terminal for review by the retailer or merchant. For example, the photograph of the genuine contact less card holder would be displayed on the video display terminal of the merchant, retailer or bank teller so the identity of the cardholder could be confirmed. This information would be viewable but cannot be saved. Concurrently, any needed updates to the system on a chip can occur simultaneously through read/write mechanisms, well known to the RFID industry. For example, this could include a change of address. The system on a chip is in a dormant state unless activated in the secure environment of the hermetically sealed container. Activation is accomplished through use of on board pressure sensors which initiate the system on a chip only upon reaching five atmospheric pressures. The increase in atmospheric pressure occurs within the confines of the hermetically sealed container.

The usefulness of this invention is several fold: 1.) it guards against unauthorized access to chose in action without resort to software encryption or biometric protection which would render the RFID transponder unwieldy and cost ineffective for a commercial RFID purpose; 2.) it guards against a holder of chose in action, in good faith, from being tracked, logged and time stamped, without volition, by a domestic or foreign government or crook in possession of a public key access provided to them by the originators of an encryption technique employed as a security system for chose in action; 3.) it provides real time video display terminal data to the retailer/merchant/banker regarding the genuine identity of the holder of the chose in action.

PREFERRED EMBODIMENT

The aforementioned invention is not to be considered as limited by the following descriptive embodiments. It is only limited by the scope of the Claims contained herein.

1.) Bank notes embedded with a system on a chip are a chose in action as defined by this invention. Accordingly, all information regarding the issuance date, serial number, denomination and any other information required by the Treasury Department for any particular banknote is recorded in a central database which is owned and controlled by the Treasury Department. The bank notes are given a unique alpha-numeric identifier prior to distribution to the public. This information is read by a hermetically sealed container when the bank notes are distributed to the public. This information is sent to the central database described herein. When the banknote is used in, for example, retail, the currency, as a singular note or as a stack, is placed by the holder in good faith (customer) or initiator into an ingesting mechanism, as described herein, which then funnels the banknotes to a hermetically sealed container. When securely locked inside this container, the system on a chip is activated by an increase in atmospheric pressure. The banknotes are identified and authenticated by a prompt and response, split algorithm which is controlled and administered by the back end database. A total of genuine currency presented by the holder in good faith is tallied and displayed on the video display terminal for use by the retail clerk. Conversely, upon the retailer making change as a reverse of the ingestion process or upon presentation by the retailer to a bank for deposit, the banknotes are again read to confirm authenticity and to once again track passage of the currency through the economic system. Any receipt for sale can be sent from the back end system by text message directly to the customer's cell phone or directly to a home or office computer via E-Mail for saving or printing, as desired by the customer. This obviates any paper receipts containing critical data, such as card number, which may be lost or stolen. It also decreases retailer workload and responsibility.

2.) Stock certificates embedded with a system on a chip are a chose in action as defined by this invention. Accordingly, all information regarding the issuance date, serial number, kind of share whether par value or no par value, class of share whether common or preferred and any other pertinent information as required by the issuing Transfer Agent for any particular corporate security is recorded in a central database which is owned and controlled by the Transfer Agent. The share certificates are given a unique alpha-numeric identifier prior to distribution to the public. This information is read by a hermetically sealed container when the stock certificates are distributed to the owners at the time of the initial public offering. This information is sent to the central database described herein. When the stock certificate is deposited to a brokerage firm the stock certificate will be read by a hermetically sealed interrogator which mechanically ingests the stock certificate directly from the hands of the owner at the "cage" section of the stock brokerage. When securely locked inside this container, the system on a chip is activated by an increase in atmospheric pressure. The stock certificates are identified and authenticated by a prompt and response, split algorithm which is controlled and administered by the back end database. The kind, class and denomination of stock certificate is read and displayed on the video display terminal for use by the cage clerk. Concurrently, the video display terminal will present a head shot digital photograph of the bona fide owner of the share certificate for comparison with the presenter. The stock certificate will then be sent to a central depository in the normal course where is again interrogated for the purposes of tracing and tracking this particular chose in action. Any receipt for deposit of the share certificate can be sent from the command and control back end system by text message directly to the cell phone of the brokerage client or directly to a home or office computer via E-Mail for saving or printing, as desired by the brokerage client. This obviates any paper receipts containing critical data, such as identity, which may be lost or stolen. It also decreases the workload and responsibility of the cage personnel at a stock brokerage.

In the case of street form certificates or when certificates are passed to a subsequent brokerage firm, individual digitized photographs would no longer be relevant. However, updated ownership or escrow information can be uploaded to the central database by cage staff. A subsequent holder in good faith of a stock certificate would be required to present alternative means of identification such as an E-Passport or a contact less credit card to authenticate identity as updated in the centralized database.

3.) Drivers licenses embedded with a system on a chip are a chose in action as defined by this invention. The driver's license is a key individual identifier in the economy. It is needed to open a bank account, obtain utility services, get connected to the internet, obtain cellular telephone service, etc. Accordingly, all information regarding the issuance of the driver's license including digital photograph, date of issuance, medical conditions such as eyesight or disabilities, driving restriction and any other pertinent information as required by the issuing state government is recorded in a central database which is owned and controlled by the state government. Each driver's license is given a unique alpha-numeric identifier in the system on a chip embedded in the license prior to distribution to drivers. This data is read by a hermetically sealed container at the time of issuance of the driver's license and the alpha-numeric number is associated with the information in a central database. This information is sent to the central database described herein. When the driver's license is used to open a bank account it will be read by a hermetically sealed interrogator which mechanically ingests the driver's license directly from the hands of the driver at the account opening desk. When securely locked inside this container, the system on a chip in the driver's license is activated by an increase in atmospheric pressure. The driver's license is identified and authenticated by a prompt and response, split algorithm which is controlled and administered by the back end database. All of the pertinent data of the license holder is read by the interrogator and displayed on the video display terminal for use by the account opening clerk. Any receipt acknowledging bank account opening can be sent from the command and control back end system by text message directly to the cell phone of the bank client or directly to a home or office computer via E-Mail for saving or printing, as desired by the banking client. This obviates any paper receipts containing critical data, such as identity, which may be lost or stolen. It also decreases the workload and responsibility of the account opening teller or clerk at a bank. It also facilitates E-Banking which can then be initiated by the client on demand.

4.) U.S. E-Passports, as an example, embedded with a system on a chip are a chose in action as defined by this invention. Accordingly, all information regarding the issuance date, passport number, name, address, date of birth, social insurance number and any other information required by the State Department for any particular E-Passport is recorded in a central database which is owned and controlled by the State Department. The E-Passports are given a unique alpha-numeric identifier prior to distribution to the public. This information is read by a hermetically sealed container when the E-Passports are distributed to the public. This information is sent to the central database described herein. When the E-Passport is used for entry in the United States the E-Passport is placed by the holder into an ingesting mechanism, as described herein, which then funnels the E-Passport to a hermetically sealed container. When securely locked inside this container, the system on a chip is activated by an increase in atmospheric pressure. The E-Passport is identified and authenticated by a prompt and response, split algorithm which is controlled and administered by the back end database. A photograph of the bona fide holder of the E-Passport is displayed on the video display terminal of the customs and immigration agent along with all relevant data. This obviates photo replacement as occurs with regular Passports. The data is able to be displayed but not saved. The information of entry into the country is entered into the back end database and the E-Passport is mechanically returned to the holder. If the system as described is down due to power failure, or any other such cause, the current system of paper inspection and stamp can be carried out. This applies to foreign jurisdictions which may not be interlinked to this type of E-Passport system. E-Passports for citizens of jurisdictions which choose to be part of an interlinked data base would be authenticated in a similar fashion as portrayed in the aforementioned example. Any information regarding the citizen can be accessed for review but not saved on the video display terminal.

I claim:

1. A method of transferring electro magnetic signals from a system on a chip, silicon substrate, integrated circuit plus antenna to an RFID interrogator including the steps of: linking chose in action containing RFID transponders to an RFID interrogator whereby chose in action is defined as polymer banknotes, paper banknotes, traveler's checks, revenue and postage stamps, bond certificates, coupons and tickets of value, security inks, certificates of origin, checks, gift certificates, passports, plastic chip based contact less credit cards, stock certificates, vehicle titles, vital records, insurance policies and personal identification cards; linking the RFID interrogator to a centralized database which contains all of the relevant information required by the system on a chip to fulfill its data function whereby the RFID transponder contains part of the algorithm to be run in synchronization with a second part of the algorithm contained in the centralized database; initiating the RFID transponder by mechanically placing same within a hermetically sealed container of RFID interrogator which pressurizes to five atmospheres which is the initiating threshold for the RFID transponder; reading the RFID transponder in a hermetically sealed container of the RFID interrogator which is impervious to all electro magnetic signals seepage from within and impervious to all electro magnetic noise or signals from without; all for the purpose of reducing the insecurity from an intruder/eavesdropping in the shared RFID medium of air by reducing the scope of the stated shared medium.

2. A system of claim 1 of transferring data from the RFID transponder to the RFID interrogator and then to a centralized command and control database whereby the RFID transponder contains a small portion of a computer program known as an algorithm which is run in a synchronized, interactive manner, between the RFID transponder and the RFID interrogator and the centralized command and control database for performing the function of ensuring that the RFID transponder is valid and is continuously linked to the RFID interrogator whereby, through the use of this system, fraud is reduced.

3. A system of claim 1 whereby the hermetically sealed container initiates the RFID transponder embedded into the chose in action by increasing atmospheric pressure through commercially available means to five atmospheres which triggers a pressure sensor within the RFID transponder to waken the transponder which then begins a handshake process with the RFID interrogator to indicate that the RFID transponder is powered up and prepared to begin a prompt and response sequence.

4. A method according to claim 1 wherein the RFID transponder is allocated, via alpha-numeric identification to an individual and the RFID interrogator is allocated, via alpha-numeric identification, to an entity requiring data from the chose in action which has the RFID transponder embedded within it.

5. A system according to claim 1 whereby the RFID transponder and the RFID interrogator are linked to a command and control centralized database which linking is via a cryptographically secure landline network or wireless communication network, or a combination of both, pursuant to a computer program known as an algorithm which algorithm is consistent with the prompt and response system programmed into all three.

* * * * *